United States Patent [19]

Kunz

[11] Patent Number: 4,471,925
[45] Date of Patent: Sep. 18, 1984

[54] APPARATUS FOR CLOSING AN AIR GAP BETWEEN A FLAP AND AN AIRCRAFT

[75] Inventor: Rüdiger Kunz, Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 444,861

[22] Filed: Nov. 26, 1982

[30] Foreign Application Priority Data

Dec. 15, 1981 [DE] Fed. Rep. of Germany ....... 3149629

[51] Int. Cl.³ .............................................. B64C 1/38
[52] U.S. Cl. ................................. 244/130; 244/215; 244/46
[58] Field of Search ............... 244/130, 211, 212, 213, 244/214, 215, 216, 217, 219, 218, 46

[56] References Cited

U.S. PATENT DOCUMENTS

| | | | |
|---|---|---|---|
| 2,137,047 | 11/1938 | Gliwa | 244/218 |
| 2,526,929 | 10/1950 | Bowcott | 244/130 |
| 3,063,659 | 11/1962 | Szerda | 244/46 |
| 3,968,946 | 7/1976 | Cole | 244/130 |
| 4,034,939 | 7/1977 | Ridley, Jr. et al. | 244/130 |
| 4,384,693 | 5/1983 | Pauly et al. | 244/214 |

FOREIGN PATENT DOCUMENTS

| | | | |
|---|---|---|---|
| 1506615 | 7/1971 | Fed. Rep. of Germany | 244/212 |
| 1560911 | 2/1980 | United Kingdom | 244/214 |
| 2055729 | 3/1981 | United Kingdom | 244/130 |

*Primary Examiner*—Trygve M. Blix
*Assistant Examiner*—Rodney Corl
*Attorney, Agent, or Firm*—W. G. Fasse; D. H. Kane, Jr.

[57] ABSTRACT

An air gap between a main flap and an adjacent aircraft portion is closed by an auxiliary flap. The auxiliary flap (8) has a hinging axis (9) extending substantially in parallel to the aerodynamic flow along aircraft portions adjacent to the auxiliary flap. With the aid of the auxiliary flap an aerodynamically improved transition zone is provided between the aircraft portion and the main flap.

10 Claims, 8 Drawing Figures

1

APPARATUS FOR CLOSING AN AIR GAP BETWEEN A FLAP AND AN AIRCRAFT

CLAIM TO PRIORITY

The present application corresponds to German patent application No. P 31 49 629.6, filed in the Federal Republic of Germany on Dec. 15, 1981. The priority of the German filing date is claimed for the present application.

BACKGROUND OF THE INVENTION

The invention relates to an apparatus for closing an air gap between a flap and an aircraft, for example, between a main flap hingedly attached to an edge of an aircraft wing and the aircraft body.

When an aerodynamically effective surface such as a steering control flap hinged to the wings of an aircraft or to the tail unit of an aircraft is moved out of its normal position into a deflected position, an air gap is formed between the adjacent aircraft portion, such as the fuselage, and the main flap. Such air gap diminishes the efficiency or effect of the main flap deflection. It is known from German Pat. (DE-PS) No. 1,506,615 to close the upstream air gap resulting from a deflection of a steering flap between the flap and the wing by means of an auxiliary flap. Such auxiliary flaps arranged along a wing edge do not solve the problem of sealing the lateral air gap between the aircraft body and the main flap.

OBJECTS OF THE INVENTION

In view of the above it is the aim of the invention to achieve the following objects singly or in combination:

to close or seal the above mentioned lateral air gap in an economical manner without the need of any substantial structural modifications of the aircraft;

to seal the above lateral air gap without any significant addition of weight to the aircraft structure;

to seal the lateral air gap in an aerodynamically efficient manner; and to use the driven movement or deflection of one flap for driving or operating the other flap.

SUMMARY OF THE INVENTION

According to the invention an auxiliary flap is arranged between the main flap and the adjacent side portion of the aircraft such as the fuselage, whereby the auxiliary flap has a hinging axis extending substantially in parallel to the aerodynamic flow along the fuselage surface. The closing of the lateral air gap may be improved to even achieve substantially a sealing of such a gap by employing sealing means in addition to the auxiliary flap, said sealing means, for example having the shape of a slide member operating in the manner of a fan which may be folded into an open position. Such slide member may be hinged to one of the two flaps and arranged for cooperation with the other flap, for example, by sliding on or in the other flap.

Further, due to the connection of the main flap with the auxiliary flap by means of a slide member it is possible, according to the invention, to positively drive but one of the two flaps and derive the drive of the other flap from the positively driven flap, thereby transmitting the driving force through the slide member. However, if desired the auxiliary flap may be driven by conventional drive means such as piston cylinders or the like, independently of the slide member which functions also as a sealing member.

According to the invention it has been advantageously made possible to bring the main flap structurally as close as possible to the adjacent lateral aircraft portion such as the side wall of the fuselage or of a gondola while at the same time providing a well sealed gap which also forms a well rounded-out transition between the main flap and the fuselage or the main flap and another side portion of an aircraft such as the tail unit.

Yet another advantage of the auxiliary flap is seen in that it makes it possible that the structure of the connection between the member carrying the main flap such as the wing or tail unit may now be lighter, yet stiffer. This lightweight, yet stiff construction of the wing or tail unit connection to the fuselage is of a special advantage in modern high performance aircraft such as combat aircraft. It has been possible according to the invention to provide the desired aerodynamic rounding between the fuselage and the main flap carrier such as the wing or the tail unit without any need for reducing the effective width of the main flap.

BRIEF FIGURE DESCRIPTION

In order that the invention may be clearly understood, it will now be described, by way of example, with reference to the accompanying drawings, wherein.

Figure 3A:
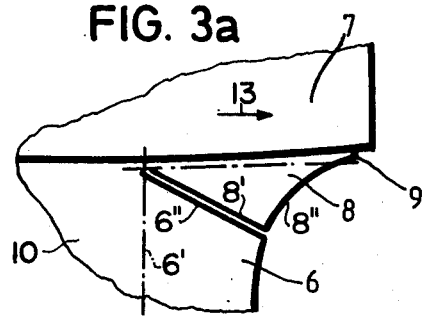
Figure 3B:
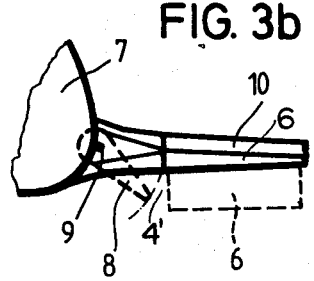
Figure 4A:
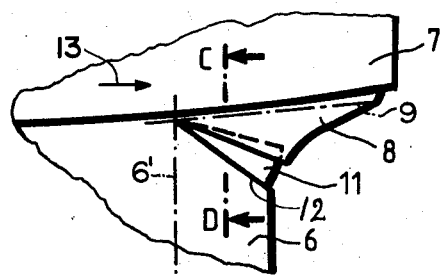
Figure 4B:
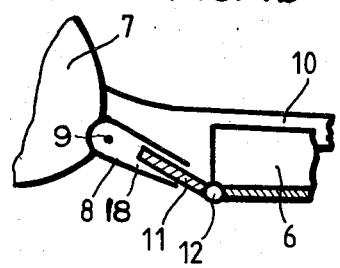

FIGS. 3a and 3b illustrate one embodiment of an auxiliary flap according to the invention; and FIGS. 4a and 4b illustrate a modification of the embodiment shown in FIGS. 3a and 3b.

DETAILED DESCRIPTION OF PREFERRED EXAMPLE EMBODIMENTS AND OF THE BEST MODE OF THE INVENTION

Figure 1A:
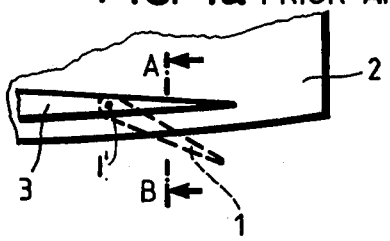
FIGS. 1a and 1b show the formation of a lateral air gap in a prior art flap construction.
Figure 1B:
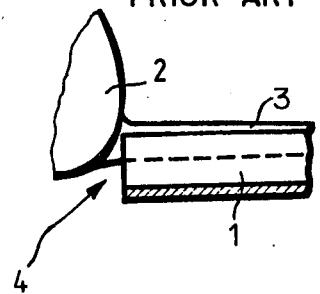

FIGS. 1a, 1b, 2a and 2b disclose prior art main flaps 1 hinged at 1' to a wing 3 of an aircraft fuselage 2. FIG. 1b is a sectional view of section line A–B in FIG. 1a. An air gap 4 is formed between the side of the fuselage 2 and the adjacent inner end of the flap 1. Such gap 4 is especially pronounced when the flap 1 is in a deflected position as shown in dashed lines in FIG. 1a and also in FIG. 1b.

Figure 2A:
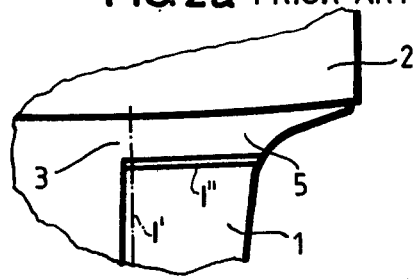
FIGS. 2a and 2b show the reduction in the effective length of a prior art flap construction due to an aerodynamically advantageous rounding of the connection between a wing and the fuselage.
Figure 2B:
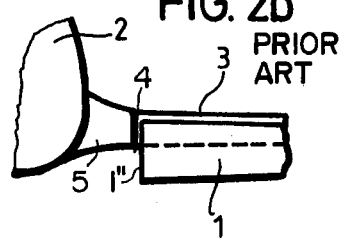

FIGS. 2a and 2b show a modified prior art arrangement in which the main flap 1 reaches with its inner edge 1" close to an aerodynamically rounded transition member 5. This type of structure somewhat improves the aerodynamic characteristics. However, in the deflected position of the main flap 1 shown in FIG. 2b it becomes clear that due to the transition member 5 the effective length of the flap 1 in the direction of the wing span is substantially reduced again due to the formation of the air gap 4. This reduction in the effective length of the flap 1 is due to the fact that the flap 1 cannot reach all the way to the fuselage 2 and because in spite of the transition member 5, the air gap 4 cannot be avoided. The air gap in FIGS. 2a and 2b is still comparable to the air gap 4 in FIGS. 1a and 1b.

FIGS. 3a and 3b illustrate a first embodiment of a construction according to the invention in which the main flap 6 is again hinged to the wing 10 of an aircraft fuselage 7. The main flap 6 has an angular shape 6″ at its end adjacent the fuselage 7. Additionally, according to the invention an auxiliary flap 8 is hinged with hinge means 9 to the side wall of the fuselage 7. The auxiliary flap 8 also has an angular edge 8′ facing the angular edge 6″ of the main flap 6. Additionally, the auxiliary flap 8 has a rounded or curved portion 8″ for improving the aerodynamic characteristics of the transition between the wing 10 and the fuselage 7.

According to the invention the hinging means 9 extend substantially in parallel to the aerodynamic flow direction indicated by the arrow 13 in FIGS. 3a and 4a.

As shown in FIG. 3b due to the deflection of the main flap 6 and the auxiliary flap 8 the total effective flap area is increased while the remaining air gap 4′ is substantially reduced. As mentioned, depending on the shape of the auxiliary flap 8 with its curved portion 8″ the auxiliary flap 8 may simultaneously function as the transition between the fuselage 7 and the wing 10.

FIGS. 4a and 4b illustrate a modification of an embodiment according to the invention in which the air gap is completely eliminated between the main flap 6 and the auxiliary flap 8 by means of a slide member 11 operatively secured to the flap 6 as shown at 12. The slide member 11 may be secured to the flap 6 by a hinge 12 at one end and the other end of the slide member 11 is able to move inside the auxiliary flap 8 along an inner slide track 18, for example in the form of an inner slot. Thus, depending on the instantaneous positions of the flaps 6 and 8 relative to each other the slide member 11 will reach more or less into the slide track 18 in the auxiliary flap 8. Rather than sliding inside the flap 8, the sliding member 11 may also slide on an outer surface portion of the flap 8 thus operating in the manner of a fan which unfolds when the flaps are deflected. In any of these combinations it may be sufficient to operate the flap 8 through the slide member 11 in response to the positive driving or deflecting of the flap 6. The mechanical reversal is also possible. Stated differently, the flap 8 may be positively driven, whereby the slide member 11 is so mechanically and sufficiently rigidly connected to the flap 6, that the latter can be operated as a result of the deflection of the auxiliary flap 8. The first hinge 9 and the second hinge 12 extend at an angle to each other as shown in FIG. 4a.

The invention as disclosed herein is suitable for incorporation in any type of aircraft or other craft such as a spacecraft. The present auxiliary flap may also be used in connection with any type of flap, for example, in connection with flaps hinged to the wings as shown herein or in connection with flaps hinged to a tail unit.

Although the invention has been described with reference to specific example embodiments, it will be appreciated, that it is intended, to cover all modifications and equivalents within the scope of the appended claims.

What is claimed is:

1. An apparatus for aerodynamically closing an air gap between a trailing edge wing flap and an adjacent side portion of an aircraft body defining an aerodynamic flow direction, comprising auxiliary flap means (8) for aerodynamically closing said air gap, said auxiliary flap means having a given length in said flow direction, and hinge means (9) having a length corresponding substantially to said given length for operatively connecting said auxiliary flap means to said adjacent aircraft body side portion substantially along said given length, said hinge means (9) extending substantially in parallel to said aerodynamic flow direction whereby an aerodynamically efficient transition is formed to close or seal such air gap.

2. The apparatus of claim 1, further comprising sealing means (11) operatively interposed between said trailing edge wing flap and said auxiliary flap means.

3. The apparatus of claim 2, wherein said sealing means comprise a slide member (11) and means (12) operatively connecting said slide member to said aircraft for cooperation with said auxiliary flap means by sliding relative to said auxiliary flap means.

4. The apparatus of claim 3, wherein said auxiliary flap means comprise a hollow slide track (8′), said slide member (11) being arranged for reaching into and sliding relative to said hollow slide track.

5. The apparatus of claim 3, wherein said connecting means (12) comprise a hinge for movably connecting said slide member (11) to said aircraft.

6. The apparatus of claim 1, further comprising connecting means (11) between said trailing edge wing flap (6) and said auxiliary flap means (8), said connecting means transmitting any driven movement of the flap of the auxiliary flap means and vice versa.

7. The apparatus of claim 6, wherein said connecting means comprise a slide member (11) operatively interposed between said trailing edge wing flap and said auxiliary flap means for driving the auxiliary flap means by the movement of the trailing edge wing flap.

8. An apparatus for closing an air gap between a main flap and an adjacent side portion of an aircraft defining an aerodynamic flow direction, comprising auxiliary flap means (8) for aerodynamically closing said air gap, first hinge means (9) operatively connecting said auxiliary flap means to said adjacent aircraft side portion, said first hinge means (9) extending substantially in parallel to said aerodynamic flow direction, sealing means (11) operatively interposed between said main flap and said auxiliary flap means (8) said sealing means comprising a sealing slide member (11) and second hinge means (12) operatively connecting said slide member to said aircraft for cooperation with said auxiliary flap means by sliding relative to said auxiliary flap means, whereby an aerodynamically efficient transition is formed to close or seal such air gap.

9. The apparatus of claim 8, wherein said first and second hinge means extend at an angle to each other.

10. The apparatus of claim 8, wherein said auxiliary flap means comprise a slide track (18) for guiding said sealing slide member, said sealing slide member being operatively interposed between said main flap and said auxiliary flap for driving the auxiliary flap by the movement of the main flap or vice versa.

* * * * *